United States Patent
Yoshimura

Patent Number: 5,551,750
Date of Patent: Sep. 3, 1996

[54] HEADREST BOOSTER SEAT

[75] Inventor: Nobuyoshi Yoshimura, Utsunomiya, Japan

[73] Assignee: Honda Giken Kogyo Kabushiki Kaisha, Tokyo, Japan

[21] Appl. No.: 242,327

[22] Filed: May 13, 1994

[51] Int. Cl.⁶ .................................................. A47C 1/08
[52] U.S. Cl. ............... 297/250.1; 297/391; 297/DIG. 6; 297/118; 297/188.01
[58] Field of Search .................................... 297/112, 118, 297/188, 192, 193, 250.1, 253, 254, 256.1, 256.13, 256.16, 311, 313, 391, 397, 403, 408, 440.1, 440.14, 463, DIG. 6, 234, 238, 410, 284.1, 216.1, 463.2, 188.01, 188.21, 188.2, 188.08, 188.09, 188.13

[56] References Cited

U.S. PATENT DOCUMENTS

| | | | |
|---|---|---|---|
| 3,279,849 | 10/1966 | Radke et al. | 297/284.5 |
| 3,449,011 | 6/1969 | Edwards et al. | 297/391 |
| 3,707,008 | 12/1972 | Fellin et al. | 5/345 |
| 4,383,713 | 5/1983 | Roston | 297/397 X |
| 4,461,510 | 7/1984 | Cunningham et al. | 297/250.1 |
| 4,568,122 | 2/1986 | Kain | 297/488 |
| 4,655,503 | 4/1987 | Kamijo et al. | 297/238 |
| 4,687,255 | 8/1987 | Klanner et al. | 297/488 |
| 4,754,999 | 7/1988 | Kain . | |
| 4,919,483 | 4/1990 | Horkey | 297/391 X |
| 4,986,603 | 1/1991 | Hanai et al. | 297/468 |
| 5,015,036 | 5/1991 | Fergie | 297/397 |
| 5,023,125 | 6/1991 | Gray | 297/DIG. 6 X |
| 5,035,465 | 7/1991 | Hanai et al. | 297/238 |
| 5,154,477 | 10/1992 | Lacy | 297/DIG. 6 X |
| 5,294,182 | 3/1994 | Colasanti | 297/467 |
| 5,308,146 | 5/1994 | Chou | 297/118 X |

FOREIGN PATENT DOCUMENTS

| | | | |
|---|---|---|---|
| 155784 | 9/1985 | European Pat. Off. | 297/256.16 |
| 47632 | 3/1983 | Japan | 297/112 |

*Primary Examiner*—Milton Nelson, Jr.
*Attorney, Agent, or Firm*—Birch, Stewart, Kolasch & Birch, LLP

[57] ABSTRACT

A vehicle seat includes a seat cushion and a seat back having a first end operatively connected to the seat cushion and a second end projecting upwardly therefrom. A headrest is normally adjustably connected to the second end of the seat back. The headrest is removably mounted to the seat back for enabling the headrest to be selectively removed therefrom. A device is provided for operatively positioning the headrest relative to the seat cushion for enabling a user to be positioned on the seat cushion to elevate the user relative to the normal elevation of the seat cushion during use. The device for operatively positioning the headrest relative to the seat cushion may include a strap positioned on each side of the headrest for receiving a seat belt for securing the headrest to the seat cushion. Other devices for securing the headrest to the seat cushion, such as hook and loop members and retaining members may be utilized.

5 Claims, 3 Drawing Sheets

HEADREST BOOSTER SEAT

BACKGROUND OF THE INVENTION

1. Field of the Invention

The present invention is directed to a headrest which may be removed from the normal position adjacent to the upper portion of a seat back for use as a booster seat to elevate a user in the seat during operation of the vehicle.

2. Description of Background Art

Hithertofore, car seats have been available for use in conjunction with infants to secure the infant within the vehicle. The car seats are helpful with regard to children who are below three or four years in age.

As a child grows older, a car seat is not useful to assist the child in being positioned within the vehicle. However, in view of the low height of a child, if the child sits within the vehicle in the normal vehicle seat, the child is normally at a lower elevation than is suitable. More specifically, the shoulder belt crosses the child's chest above the most effective restraint position. This location of the shoulder belt may also be uncomfortable for the child. Further, the child's head is below the window of the vehicle, and thus, the child is not able to see the surrounding area during operation of the vehicle.

SUMMARY AND OBJECTS OF THE INVENTION

It is an object of the present invention to provide a headrest booster seat wherein a child may be selectively elevated relative to a seat cushion of a vehicle seat to permit proper positioning of the shoulder belt on the child and to permit the child to see out of the vehicle windows during use.

It is another object of the present invention to provide a headrest which may be used in the normal manner for an adult during normal use of a vehicle seat. In addition, the headrest may be removed from the normal position and placed in contact with the seat cushion of the vehicle seat to permit a child to be elevated relative to the normal elevation of the vehicle seat.

A further object of the present invention is to provide a seat booster without increasing the number of parts required for the seat and the seat belt and the secondary restraining system.

These and other objects of the present invention are achieved by providing a vehicle seat which includes a seat cushion and a seat back having a first end operatively connected to the seat cushion and a second end projecting upwardly therefrom. A headrest is normally adjustably connected to the second end of the seat back. The headrest is removably mounted to the seat back for enabling the headrest to be selectively removed therefrom. A device is provided for operatively positioning the headrest relative to the seat cushion for enabling a user to be positioned on the seat cushion to elevate the user relative to the normal elevation of the seat cushion during use. The device for operatively positioning the headrest relative to the seat cushion may include a strap positioned on each side of the headrest for receiving a seat belt for securing the headrest to the seat cushion. Other devices for securing the headrest to the seat cushion, such as hook and loop members and retaining members, may be utilized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
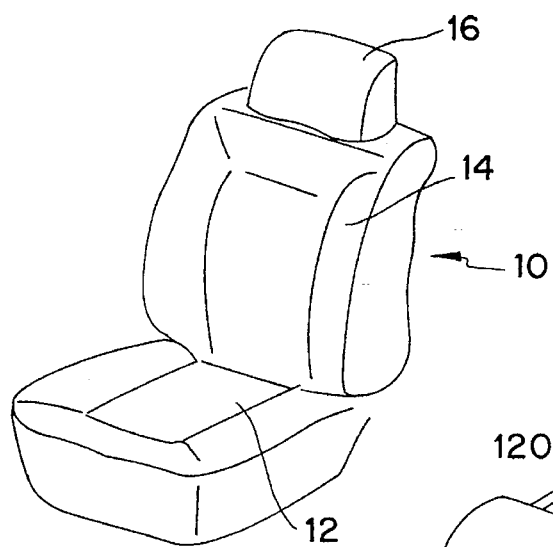
FIG. 1 is a perspective view of a conventional vehicle seat with a headrest secured thereto.

As illustrated in FIG. 1, a conventional seat 10 includes a seat cushion 12 and a backrest 14. A headrest 16 is secured in an adjustable manner to permit elevation of the headrest 16 relative to the backrest 14.

Figure 2:
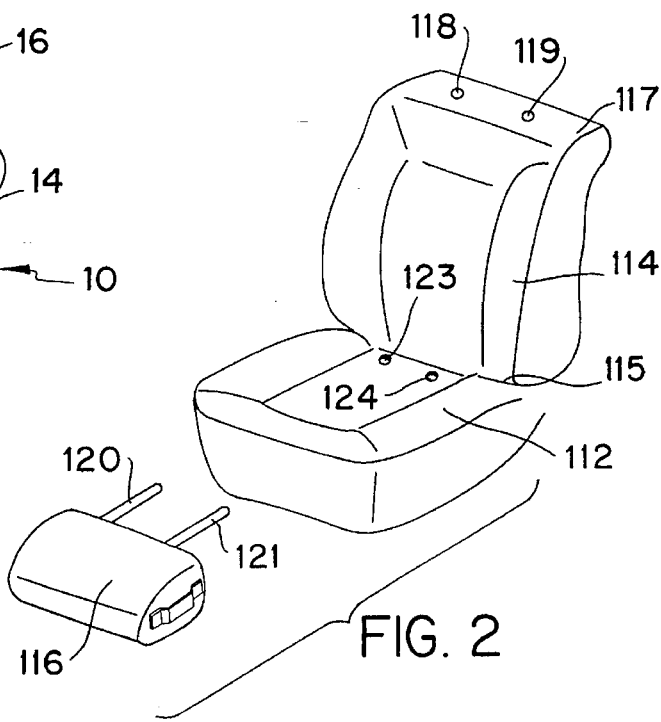
FIG. 2 is a perspective view of a modified vehicle seat which includes two apertures adjacent to the seat cushion for mounting the headrest on the seat cushion.

FIG. 2 illustrates a first embodiment of the present invention wherein a headrest 116 is removed from a backrest 114. Similar to the embodiment illustrated in FIG. 1, the backrest 114 is mounted on the seat cushion 112 at a first end 115 to permit adjustment of the backrest 114 relative to the seat cushion 112. Apertures 118, 119 are mounted on a second end 117 of the backrest 114. The apertures 118, 119 are adapted to receive the retaining members 120, 121, respectively, in an adjustable manner to permit elevation of the headrest 116 relative to the backrest 114.

Figure 3:
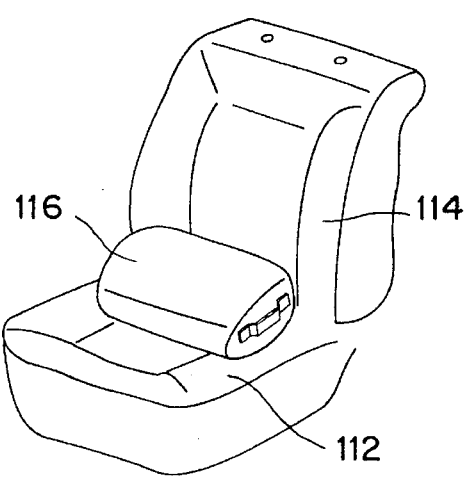
FIG. 3 is a perspective view illustrating the headrest disposed on the seat cushion.

As illustrated in FIG. 2, the headrest 116 has been removed from the backrest 114. Apertures 123, 124 are provided in the seat cushion 112 to permit securement of the retaining members 120, 121 relative thereto. As illustrated in FIG. 3, the headrest 116 has been secured to the seat cushion 112. The backrest 114 is mounted on the seat cushion in a conventional manner.

Figure 4:
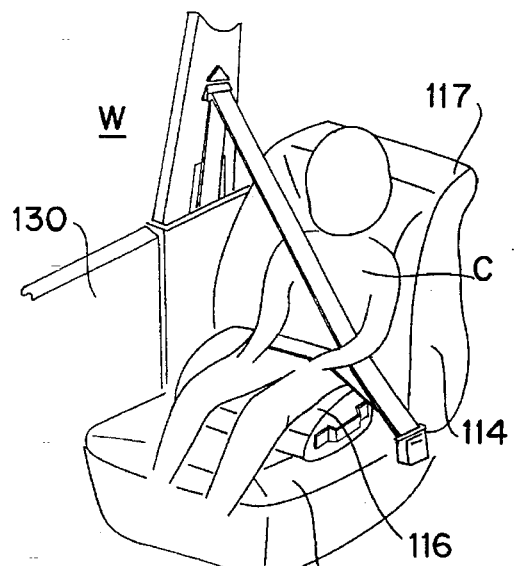
FIG. 4 is a perspective view illustrating an individual disposed on the seat cushion with a seat strap secured thereto to properly position the individual within the vehicle.

As illustrated in FIG. 4, a child C is positioned on the headrest 116 which is mounted on the seat cushion 112. The child's legs are permitted to extend forwardly from the headrest 116. The child's back is disposed against the backrest 114. In view of the height of the child C, it is not necessary to have a headrest positioned at the second end 117 of the backrest 114. Thus, during use of a vehicle seat by a child, it is permissible to utilize the headrest 116 as a seat booster to elevate the child to be above the solid portion of a door 130 of a vehicle. As illustrated in FIG. 4, the elevation of the head of the child C is on the same elevation as a window W of a vehicle. Thus, the shoulder belt is positioned to better restrain the child C and is more comfortable to wear. Additionally, the child is permitted to see the surrounding area as the vehicle is in operation.

Figures 5, 6:
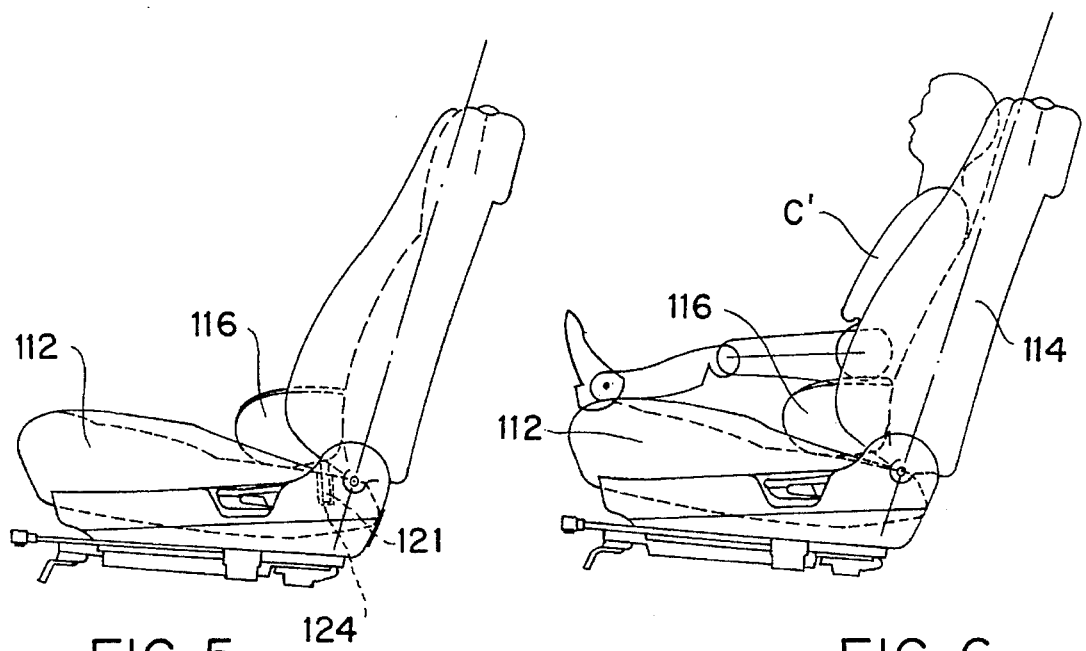
FIG. 5 is a side elevational view illustrating the headrest according to the present invention with retaining members being disposed within apertures in the seat cushion to secure the headrest relative thereto.
FIG. 6 is a side elevational view illustrating schematically the positioning of an individual on the headrest positioned on the seat cushion.

FIG. 5 is a side elevation view illustrating the mounting of the headrest 116 relative to the seat cushion 112. The retaining member 121 is secured within the aperture 124 to affix the headrest 116 relative to the seat cushion 112. The securement of the headrest 116 relative to the seat cushion 112 is necessary to prevent the headrest 116 from being dislodged during normal use.

FIG. 6 also illustrates the positioning of an individual C' relative to the seat cushion 112, the headrest 116 and the seat back 114. The elevation of the individual's head is at a suitable elevation so as to not require the use of a conventional headrest. The headrest is designed for use by an adult having a predetermined height. Thus, the present invention permits the use of a normal headrest as a booster seat to permit an individual to be elevated relative to the normal elevation of the seat cushion during operation of the vehicle.

Figures 7, 10:
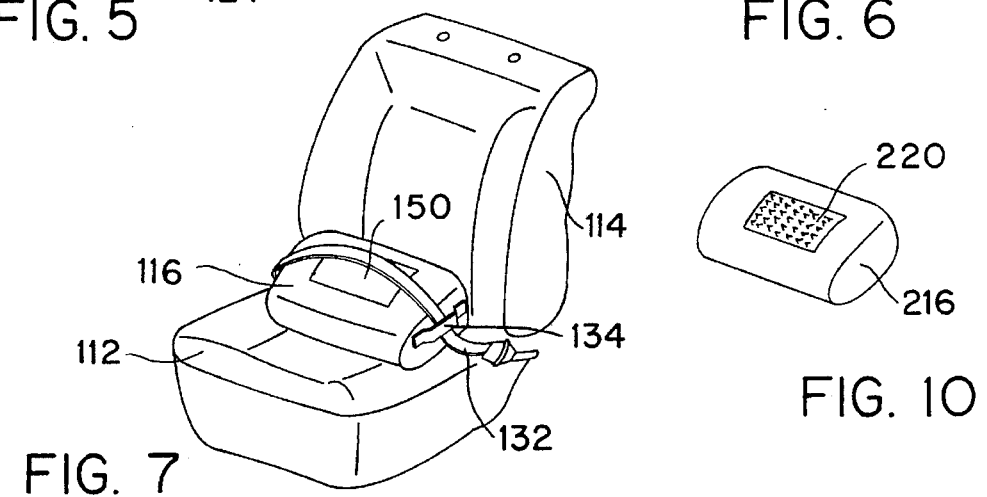
FIG. 7 is a perspective view illustrating a seat belt positioned within the straps attached to the headrest for securing the headrest to the seat cushion.
FIG. 10 is a partial perspective view illustrating hook or loop members for retaining the headrest relative to the seat cushion.
Figure 13:
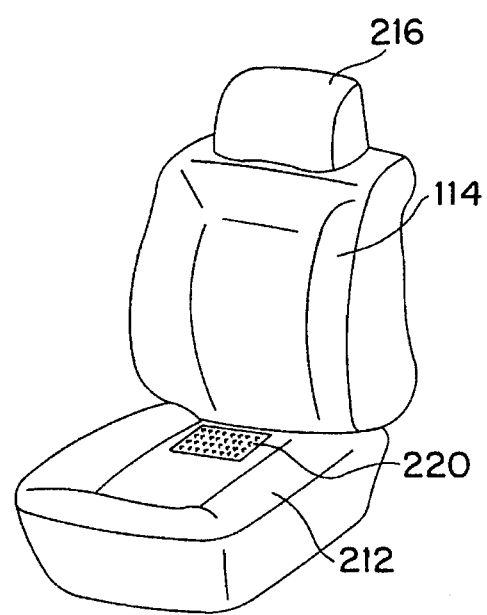
FIG. 13 illustrates a headrest with strap members disposed on each side.

As illustrated in FIG. 7, a seat belt 132 may be provided for securing the headrest 116 relative to the seat cushion 112. As illustrated in FIG. 13a retaining strap 134 is positioned on each lateral side of the headrest 116. The retaining strap 134 receives the conventional lap belt for securing the headrest to the seat. In this way, the headrest 116 may be firmly affixed relative to the seat cushion 112 during use. One end of the strap is separable from the headrest so that the shoulder belt does not pass between the headrest and the strap when the headrest is secured to the seat.

Figures 8, 9:
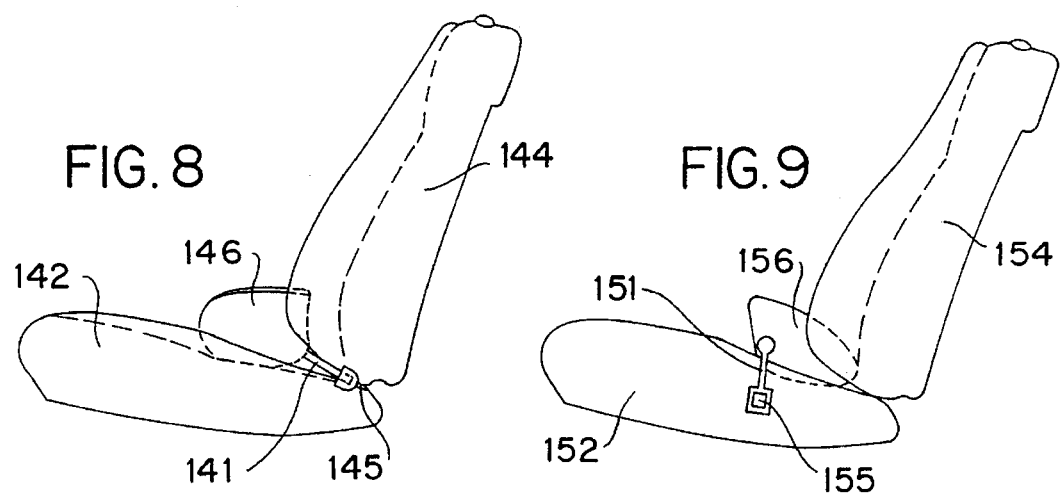
FIG. 8 is a side elevational view of another embodiment of the present invention wherein the retaining members are secured adjacent to the area of contact of the backrest and the seat cushion.
FIG. 9 is a side elevational view illustrating another embodiment of the present invention wherein the headrest is secured adjacent to the seat cushion.
Figure 12:
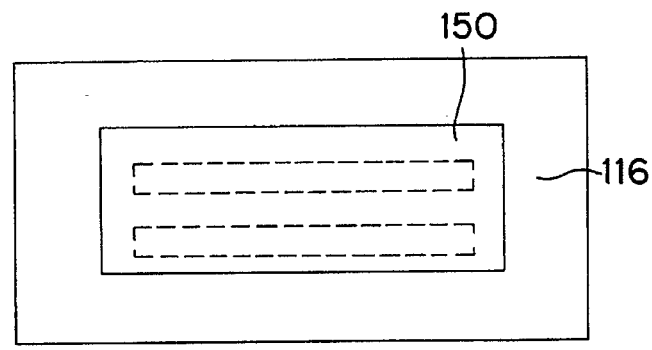
FIG. 12 illustrates a perspective view of a headrest with the retaining members disposed within a receptacle.

FIG. 8 illustrates a side elevational view wherein a second embodiment of the present invention is illustrated. A headrest 146 is mounted on a seat cushion 142. A retaining member 141 is designed to be secured within a retaining engagement member 145. A backrest 144 is pivotally mounted relative to the seat cushion 142. In the embodiment illustrated in FIG. 8, the retaining member 141 may actually be positioned within the area between the seat cushion 142 and the backrest 144. Thus, no apertures are necessary in the seat cushion for securing the headrest 146 during use as a seat booster. In addition, as illustrated in FIG. 12, a receptacle 150 may be positioned within the headrest 116 for containing the device for positioning the headrest relative to the seat back.

An adjustable slide mechanism of a conventional headrest may be utilized as the locking mechanism for securing the retaining member 141 of the headrest 146 relative to the seat cushion 142. In this way, the headrest may be adjusted to project a predetermined distance from the backrest 144 of the vehicle seat.

In addition, the retaining members 120, 121 and 141 may be mounted relative to the headrest 146 to permit pivoting relative to the headrests 146. If pivoting is permitted, the pivoting is in only one direction so that the headrests 146 function as a headrest that will not pivot when installed on the top of the seat back 114 or backrest 144 during normal use.

FIG. 9 illustrates another embodiment of the present invention wherein a seat cushion 152 is provided with a headrest 156. A seat back 154 is pivotally mounted relative to the seat cushion 152. A retaining member 151 may extend outwardly from the headrest 156 to secure the headrest 156 relative to the seat cushion 152 by means of the securing mechanism 155.

Figure 11:
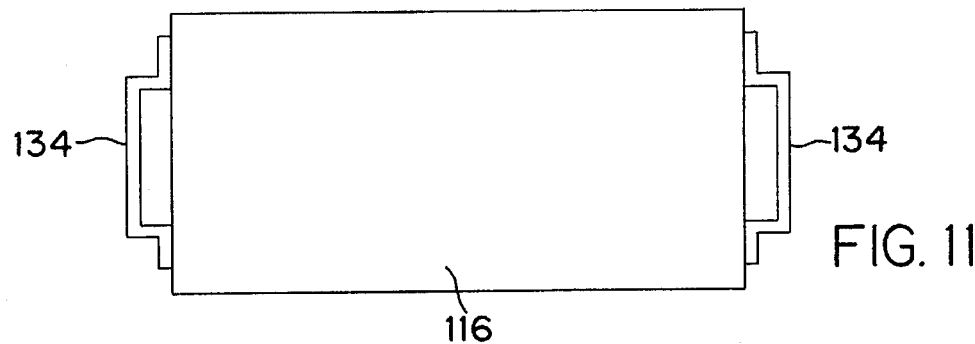
FIG. 11 is a perspective view illustrating the seat cushion with hoop or loop members attached thereto.

In another embodiment of the present invention, as illustrated in FIGS. 10 and 11 hook or loop members 220 may be provided on the headrest 216 or the seat cushion 212 for securing the two relative to each other. In this way, the removal of the headrest 216 from the seat back will enable an individual to very easily secure the headrest 216 to the seat cushion by means of the hook and loop members 220.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle seat comprising:

a seat cushion;

a seat back including a first end operatively connected to said seat cushion and a second end projecting upwardly therefrom;

a headrest removably connected to the second end of the seat back, for enabling said headrest to be selectively removed therefrom, said headrest includes a front portion, a rear portion and two side portions; and a strap positioned on each of said two side portions of said headrest for receiving a seat belt for securing said headrest to said seat cushion for operatively positioning said headrest relative to said seat cushion as a booster seat for enabling an individual to be elevated relative to a normal elevation of said seat cushion.

2. A vehicle seat comprising:

a seat cushion having an upwardly facing seating surface;

a seat back including a first end operatively connected to said seat cushion and a second end projecting upwardly therefrom;

a headrest removably connected to the second end of the seat back, for enabling said headrest to be selectively removed therefrom;

two retaining members projecting outwardly from said headrest for selectively mounting said headrest directly to said second end of said seat back; and securing members mounted on said seating surface of said seat cushion for receiving said retaining members and for securing said headrest to said seat cushion for operatively positioning said headrest upon said seating surface of said seat cushion as a booster seat for enabling an individual to be elevated relative to a normal elevation of said seat cushion.

3. A vehicle seat comprising:

a seat cushion having an upwardly facing seating surface;

a seat back including a first end operatively connected to said seat cushion and a second end projecting upwardly therefrom;

a headrest removably connected to the second end of the seat back, for enabling said headrest to be selectively removed therefrom; and hook members secured to said headrest and loop members secured to said seating surface of said seat cushion for operatively positioning said headrest upon said seating surface of said seat cushion as a booster seat for enabling an individual to be elevated relative to a normal elevation of said seat cushion.

4. A vehicle seat comprising:

a seat cushion;

a seat back including a first end operatively connected to said seat cushion and a second end projecting upwardly therefrom;

a headrest removably connected to the second end of the seat back, for enabling said headrest to be selectively removed therefrom;

at least one retaining member projecting outwardly from said headrest and a securing member for receiving said retaining member and for securing said headrest to said seat cushion for operatively positioning said headrest relative to said seat cushion as a booster seat for enabling an individual to be elevated relative to a normal elevation of said seat cushion; and a receptacle disposed within the headrest, said receptacle being large enough to wholly contain said retaining member, and said retaining member for operatively positioning said headrest relative to said seat cushion being positioned within said receptacle during normal use of said headrest.

5. A vehicle seat comprising:

a seat cushion having an upwardly facing seating surface;

a seat back including a first end operatively connected to said seat cushion and a second end projecting upwardly therefrom;

a headrest removably connected to the second end of the seat back, for enabling said headrest to be selectively removed therefrom; and loop members secured to said headrest and hook members secured to said seating surface of said seat cushion for operatively positioning said headrest upon said seating surface of said seat cushion as a booster seat for enabling an individual to be elevated relative to a normal elevation of said seat cushion.

* * * * *